(12) United States Patent
Kreiner et al.

(10) Patent No.: US 8,937,534 B2
(45) Date of Patent: Jan. 20, 2015

(54) REMOTE CONTROL OF ELECTRONIC DEVICES VIA MOBILE DEVICE

(75) Inventors: Barrett M. Kreiner, Woodstock, GA (US); Jonathan L. Reeves, Roswell, GA (US); Ryan Schaub, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 874 days.

(21) Appl. No.: 12/963,214

(22) Filed: Dec. 8, 2010

(65) Prior Publication Data

US 2012/0146918 A1 Jun. 14, 2012

(51) Int. Cl.
*G08C 19/00* (2006.01)
(52) U.S. Cl.
USPC ..................... 340/12.22; 340/12.23
(58) Field of Classification Search
CPC ........... G08C 2201/92; G08C 2201/33; G08C 2201/93; H04N 5/4403; H04N 21/42204
USPC ...................... 340/4.3, 12.22, 12.23; 709/223; 715/740, 780, 835
See application file for complete search history.

(56) References Cited

U.S. PATENT DOCUMENTS

| | | | |
|---|---|---|---|
| 6,850,285 B2 | 2/2005 | Eaton | |
| 7,236,208 B2 | 6/2007 | Eaton | |
| 7,873,774 B2 | 1/2011 | Orishko | |
| 2002/0083446 A1 | 6/2002 | Eaton | |
| 2003/0080874 A1* | 5/2003 | Yumoto et al. | 340/825.71 |
| 2003/0103088 A1* | 6/2003 | Dresti et al. | 345/835 |
| 2006/0158368 A1* | 7/2006 | Walter et al. | 341/176 |
| 2006/0179452 A1* | 8/2006 | Amodeo et al. | 725/25 |
| 2007/0296552 A1* | 12/2007 | Huang et al. | 340/10.5 |
| 2008/0034081 A1* | 2/2008 | Marshall et al. | 709/223 |
| 2009/0023389 A1* | 1/2009 | Paryani | 455/41.2 |
| 2009/0244403 A1 | 10/2009 | Beals | |
| 2009/0284577 A1 | 11/2009 | Kumar | |
| 2009/0298514 A1* | 12/2009 | Ullah | 455/456.5 |
| 2010/0052843 A1* | 3/2010 | Cannistraro | 340/3.32 |
| 2010/0229194 A1* | 9/2010 | Blanchard et al. | 725/39 |
| 2011/0037637 A1 | 2/2011 | Van Vleck et al. | |
| 2011/0138317 A1* | 6/2011 | Kang et al. | 715/780 |
| 2012/0133841 A1* | 5/2012 | Vanderhoff et al. | 348/734 |

* cited by examiner

*Primary Examiner* — Van T. Trieu
(74) *Attorney, Agent, or Firm* — Guntin & Gust, PLC; Joseph Hrutka

(57) ABSTRACT

Devices and systems are provided for controlling electronic devices using a mobile remote control device. A mobile remote control device provides an interface to control a plurality of electronic devices. The mobile device has a unique identifier, and the electronic device transmits a presentation of a remote control to the mobile device. A user of the mobile device controls the electronic device by operating the "virtual" remote control displayed on the mobile device. The user may further define his or her custom remote control. The user may define batches of commands, or "macros" that transmit a specific series of commands to one or more electronic devices. Proximity and motion of a mobile device may be used as an input, such that the electronic devices are programmed to react in specific ways depending upon the position and movement of the user of the mobile device.

20 Claims, 7 Drawing Sheets

REMOTE CONTROL OF ELECTRONIC DEVICES VIA MOBILE DEVICE

BACKGROUND OF THE SUBJECT DISCLOSURE

1. Field of the Subject Disclosure

The present subject disclosure relates to electronic devices. In particular, the present subject disclosure relates to remote control of electronic devices using a mobile device.

2. Background of the Subject Disclosure

The electronic world has undoubtedly revolutionized our conceptions and abilities to communicate, educate, and entertain. Starting with the development of transducers and displays, past the subject disclosure of the microprocessor, and arriving at today's microcomputer-driven and network-capable electronics, one may conclude that we are truly immersed in the next generation of electronic interactivity. However, one particular aspect of today's electronics industry still remains stagnant—the remote control. No matter how technologically advanced the display and processing technology might be in the latest flat-screen television, the remote control still remains an archaic control mechanism. The same options, layouts, and standards have existed for decades, and carry with them the same host of yet-unresolved problems. Take for instance the ubiquitous infra-red (IR) remote control. It requires a line of sight to operate, which means that a user must point the remote control at the electronic device for it to work. Even then, sometimes buttons have to be pushed several times to achieve the desired effect. Moreover, each original equipment manufacturer (OEM) has their own remote control layout for their specific device. Considering how many electronic devices the typical living room contains, the several remote controllers for each electronic device each has its own layout, takes up space, and needs batteries. It would be nice to control more devices (such as home appliances) with remote controls, but who wants more remote control devices lying around?

Several subject disclosures in the field attempt to overcome these issues. The most common of these is the universal remote control. However, this approach has its own set of problems. Namely, the traditional programming of the remote control for new devices is a tedious process. Further, batch processing of commands to electronic devices is not properly handled by traditional universal remotes. An IR universal remote that attempts to control a plurality of devices at a time often gets the sequence of signals mixed up, leading to unpredictable or undesired results. BLUETOOTH radio may be used as an alternative to IR. However, BLUETOOTH is costly, and present-day BLUETOOTH devices are expensive, and do not adequately address the concerns involved with controlling multiple electronic devices. They also suffer the same complexities when it comes to programming the remote control for a new electronic device. Finally, certain companies have incorporated remote control software into existing devices such as smartphones and PDAs. However, such network-based remote controls might not work with devices outside a certain proximity. Generally, all present-day technologies have the problem of programming the remote control for new devices, as the operator of the remote control has to do all the work. Consequently, the problem of the learning curve for new devices is never truly resolved, whether it comes to using new remote control devices or programming existing ones for new devices. Moreover, present day technology does not alleviate issues such as finding lost remotes, using the wrong remote for the wrong device, controlling non-traditional devices (such as home appliances, HVAC systems, etc.), and offering permissions of control to different users.

What is therefore needed is a means to control one or more electronic devices using a single remote that does not have to be manually programmed.

SUMMARY OF THE SUBJECT DISCLOSURE

The present subject disclosure solves the above problems by controlling electronic devices using a mobile remote control device. A mobile remote control device (or simply "mobile device") is equipped with a display that provides an interface to control a plurality of electronic devices. The mobile device receives a presentation of controls that include commands to control one or more of the plurality of electronic devices. The mobile device has a unique identifier, and the electronic device transmits the presentation to the mobile device upon verifying that the unique identifier has permission to control the electronic device. The mobile device displays the controls on its display, and establishes a communications path with the electronic device. A user of the mobile device controls the electronic device by operating the "virtual" remote control displayed on the mobile device, for instance, by touching a touchscreen display that is displaying the virtual remote control. The user may further define his or her custom remote control, and command the mobile device to map the received presentation of controls to the custom remote control provided by an application or software within a memory of the mobile device. The remote control application may display a plurality of electronic devices on its user interface, and the user may select which device or combination of devices to operate via the remote control. The user may define batches of commands, or "macros" that transmit a specific series of commands to one or more electronic devices. Various communications paths may be set up depending on the type of network being used and the capabilities of the electronic devices. Proximity and motion of a mobile device may be used as an input, such that the electronic devices are programmed to react in specific ways depending upon the position and movement of the user of the mobile device.

In one exemplary embodiment, the present subject disclosure is a mobile remote control device, including a memory, a processor in communication with the memory, a transceiver in communication with the processor, a display in communication with the processor, an input device in communication with the processor, and logic on the memory for transmitting a unique identifier, receiving a presentation of a remote control from an electronic device across a network, the presentation including an identity of the electronic device, and displaying the remote control on the display. The mobile logic is further for receiving an input from a user via the input device, mapping the input to a command on the remote control, and transmitting the command to the electronic device. The mobile remote control device further includes customization logic on the memory for enabling a user to define a custom remote control and mapping the received presentation of the remote control to the user-defined custom remote control.

In another exemplary embodiment, the present subject disclosure is a system for remotely controlling an electronic device. The system includes a mobile device having a mobile processor, a mobile memory, a mobile transceiver, a display, and an input device, wherein the transceiver enables communication across a network, an electronic device having a device transceiver to enable communication across the network, device logic on the electronic device for broadcasting an identity of the electronic device, receiving a unique identifier of the mobile device, and transmitting a presentation of a remote control of the electronic device to the mobile device via a communication path on the network, and mobile logic on the mobile device for transmitting the unique identifier, receiving the presentation of the remote control, and displaying the remote control on the display of the mobile device.

In yet another exemplary embodiment, the present subject disclosure is A system for remotely controlling an electronic device. This system includes a mobile device having a mobile processor, a mobile memory, a mobile transceiver, a display, and an input device, wherein the transceiver enables communication across a network, an electronic device having a device transceiver to enable communication across the network, device logic on the electronic device to broadcast an identity of the electronic device and to receive a unique identifier of the mobile device, and mobile logic on the mobile device for transmitting the unique identifier, receiving a presentation of a remote control for the electronic device, and displaying the remote control on the display of the mobile device, wherein the presentation of the remote control for the electronic device is transmitted by a provisioning device.

DETAILED DESCRIPTION OF THE SUBJECT DISCLOSURE

Figure 1:
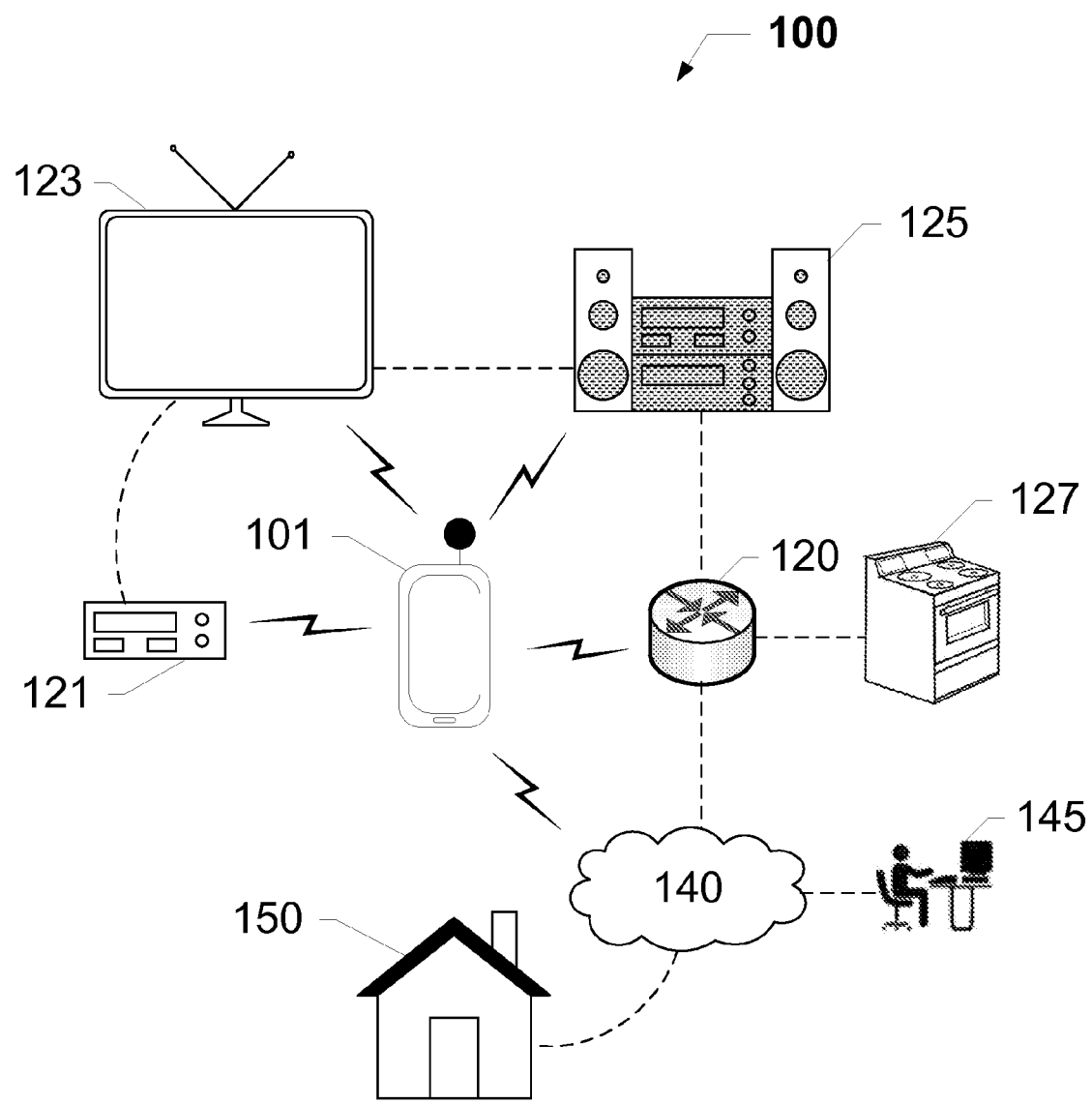
FIG. 1 shows a system for remotely controlling electronic devices, according to an exemplary embodiment of the present subject disclosure.

The following disclosure presents a novel technique for controlling electronic devices using a mobile remote control device. A mobile remote control device (or simply "mobile device") is equipped with a display that provides an interface to control a plurality of electronic devices. The plurality of electronic devices is capable of receiving signals from the mobile device, and may be network-ready by virtue of transceivers incorporated within. The mobile device receives a presentation of controls that include commands to control one or more of the plurality of electronic devices. In some embodiments, the electronic device itself transmits the presentation to the mobile device. In related embodiments, the mobile device has a unique identifier, and the electronic device transmits the presentation to the mobile device upon verifying that the unique identifier has permission to control the electronic device. In either case, the mobile device displays the controls on its display, and establishes a communications path with the electronic device. A user of the mobile device controls the electronic device by operating the "virtual" remote control displayed on the mobile device, for instance, by touching a touchscreen display that is displaying the virtual remote control. The user may further define his or her custom remote control, and command the mobile device to map the received presentation of controls to the custom remote control.

Mobile logic for performing these tasks and displaying the interfaces is programmed as an application or software within a memory of the mobile device. In some embodiments, presentations from a plurality of electronic devices are received at the mobile device. The mobile logic then displays the plurality of electronic devices on its user interface, and the user may select which device or combination of devices to operate via the remote control. The user may define batches of commands, or "macros" that transmit a specific series of commands to one or more electronic devices. Various communications paths may be set up depending on the type of network being used and the capabilities of the electronic devices. Further, the user's identity, personal preferences, and different device configurations may be stored on the mobile memory for access. Moreover, the "constellation" of devices enables proximity and motion of the mobile device to be used as an input, such that the electronic devices are programmed to react in specific ways depending upon the position and movement of the user of the mobile device. These and other novel features of the present subject disclosure are described in greater detail below with reference to the figures.

For the purposes of the following disclosure, the term "mobile remote control device," or "mobile device," refers to any electronic device capable of wirelessly sending and receiving data. A mobile device may have a processor, a memory, a transceiver, a display, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

An "electronic device," according to the present subject disclosure, is any machine or device that is operable or controllable by a mobile device. The term most commonly refers to consumer electronics such as televisions, set-top boxes, audio systems, video-game consoles, computers, home appliances, and so on. However, in some embodiments, the term is extended to any electronic or mechanical devices, such as those in heating/ventilation/airconditioning (HVAC) systems, door locks (including those in buildings, cars, etc.), elevators, lighting/windows/curtains, and so on. Other examples will become evident in light of this disclosure. Electronic devices generally have stored within them logic that enables them to transmit presentations of their remote controls based upon original equipment manufacturer (OEM) specifications. Electronic devices are therefore able to communicate with a mobile device either via a direct connection or via a network, and may also be connected or daisy-chained with other electronic devices.

Mobile and electronic devices may communicate with each other and with other elements via a network, for instance, a wireless network, or a wireline network. A "network" can include broadband wide-area networks such as cellular networks, local-area networks (LAN), wireless LAN (Wi-Fi), near-field communication (NFC) networks, etc. Networks include combinations of networks, such as the Internet. On the other hand, a network includes an ad-hoc peer-to-peer network, such as a direct connection between two devices. Communication across a network is preferably packet-based; however, radio and frequency/amplitude modulations networks can enable communication between communication devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. In some embodiments of the present subject disclosure, a communications path is set up between a mobile device and one or more electronic devices. The communications path may traverse one or more different types of networks.

For the following description, it can be assumed that most correspondingly labeled structures across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern. The only exception is method steps (S101, S301, etc.) that need not be correspondingly labeled.

FIG. 1 shows a system for remotely controlling electronic devices, according to an exemplary embodiment of the present subject disclosure. System 100 includes mobile device 101, electronic devices 121, 123, 125, and 127, network router 120, wide-area network 140, technical support/provisioning 145, and building 150. As shown, mobile device 101 is in wireless communication with electronic devices 121, 123, 125, router 120, and network 140. This wireless communication is a radio-frequency (RF) based communication, including but not limited to cellular, Wi-Fi, BLUETOOTH, NFC, etc. Further, electronic devices 121, 123, and 125 are able to communicate with each other and with router 120 via any known technology, including audio/video (A/V) links such as RCA, digital audio, RF, HDMI, etc., as well as other packet-based links such as ETHERNET, Wi-Fi, etc. In other words, any electronic connection enabling a transfer or exchange of data is possible between electronic devices 121, 123, 125, router 120, and appliance 127. Moreover, router 120 provides connectivity to a wide-area network (WAN) 140. As a network has been defined to include one or more types of networks, WAN 140 includes broadband networks, gateways, mobile networks, and the Internet. Consequently, mobile device 101 is also shown to be in wireless communication with network 140, via a 3G or similar transceiver. A back-end 145 of network 140 provides technical support, provisioning, and billing services. Finally, building 150 includes a plurality of electronic devices that are able to communicate across network 140. Building 150 includes homes, offices, storage units, etc., as well as the components thereof and within.

In operation, logic onboard mobile device 101 enables detection of any electronic device within a proximity of mobile device 101. This is made possible by enabling the electronic devices to broadcast an identifier that is capable of being detected by mobile devices such as mobile device 101. Transceivers incorporated within each of electronic devices 120, 121, 123, 125, and 127 enable such a broadcast. For instance, router 120 includes an 802.11 wireless LAN (W-LAN) transceiver, and logic for broadcasting a service set identifier (SSID). The SSID merely includes a short string indicating a name or other definable attributes of the network. A W-LAN transceiver on mobile device 101 detects the SSID. Similarly, set-top box 121 includes a transceiver, such as a BLUETOOTH transceiver, which broadcasts its identity to other BLUETOOTH devices in the vicinity. The transceiver is provided for a number of applications, such as data transfer to other devices, streaming media, firmware updates over the internet, etc. Likewise, TV 123 and stereo 125 have wireless transceivers such as BLUETOOTH, Wi-Fi, or other NFC transceivers, including RFID, and logic onboard for enabling the transceivers to broadcast an identifier. The broadcast is detected by an appropriate transceiver included within mobile device 101.

Logic onboard mobile device (mobile logic) 101 then transmits, via the appropriate transceiver, a request to connect to one or more of electronic devices 121, 123, and 125. The request to connect may include a request for a presentation. The request data packet (or packets) is received at the electronic device. The device logic responds with a transmission of a presentation, or layout, of controls used to command the electronic device. The presentation is likely in a form defined by an original equipment manufacturer (OEM) of the electronic device. For instance, the presentation is provided in an XML format that is readable by the mobile logic. The presentation is received by a mobile transceiver, and displayed by mobile logic on a display or screen of mobile device 101. For instance, a mobile remote control application (or "remote control") is executed on mobile device 101 that includes logic to parse the presentation, retrieve a list of commands and their associated layouts, and display the commands to a user of mobile device 101. The user executes any command displayed on mobile device 101 by pushing a button or touching a region of a touch-sensitive display (touchscreen) corresponding to the command mapped on the layout. The mobile logic transmits the command back to the electronic device. The command data packet is received, parsed, and executed by device logic onboard the electronic device. For instance, a user commands set-top box 121 to change the channel or record a televised program by pushing the appropriate button displayed on the touchscreen of mobile device 101.

The mobile logic is further programmed to control a plurality of electronic devices, including set-top box 121, TV 123, stereo 125, and even router 120. For instance, a user accesses proxy settings onboard router 120 via a remote interface presented on mobile device 101. Appliance 127 may be accessed via router 120. Components of building 150 may be accessed and remotely controlled via network 140. This feature is further described with respect to FIGS. 5 and 6. Additionally, the mobile logic permits a user to define a custom remote control for a specific electronic device or combination of electronic devices. For instance, a user specifies that only certain selected commands are to be displayed, with the remained hidden. The user may control multiple electronic devices by creating macros and assigning relationships between electronic devices. These features are further explained in FIGS. 4 and 5.

Further, although an infrastructure network is shown, the above-described embodiment may also be implemented in an ad-hoc manner. In other words, an electronic device broadcasts a specific SID for a direct device-to-device connection. This enables remote control of devices without the need for any routers, local area networks, etc., for instance, in a remote location with limited connectivity (camp, cabin, etc.). Regardless of the type of network, the same information (e.g., presentation, etc.) is transferred to the mobile device.

Figures 2A, 2B:
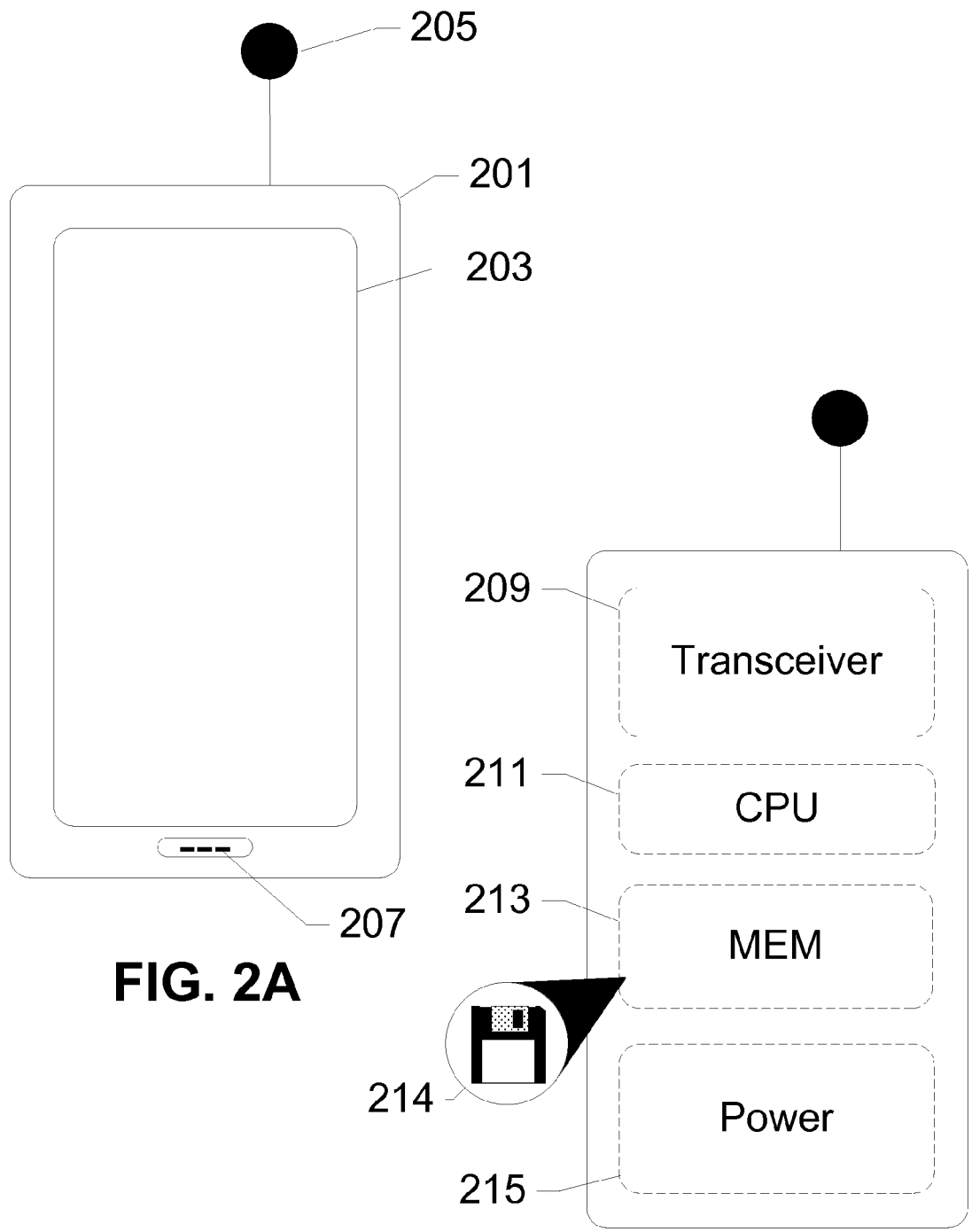
FIGS. 2A and 2B show the components of a mobile remote control device, according to an exemplary embodiment of the present subject disclosure.

FIGS. 2A and 2B show the components of a mobile remote control device, according to an exemplary embodiment of the present subject disclosure. With reference to FIG. 2A, mobile device 201 includes a display 203, an antenna 205, and a microphone 207. With reference to FIG. 2B, mobile device 201 further includes a transceiver 209, a central processing unit (CPU) 211, a memory 213, and a power supply 215. Display 203 is an LCD, LED, OLED, liquid paper, or any equivalent display device that is in communication with CPU 211 and can display a user interface of sufficient complexity to provide a remote control. Display 203 is shown as a touchscreen, and is therefore considered an input and output device. Microphone 207 provides a means for transmitting oral commands, as well as for verbal communication across, for instance, a telephone network. Antenna 205 is a transducer designed to transmit or receive electromagnetic waves (such as RF signals), and transceiver 209 is a microprocessor designed to process incoming signals and to transmit signals via antenna 205. Transceivers enable communication with other devices across a network or communications path. Transceiver 206 may be a cellular, wireless LAN, BLUETOOTH, etc. Transceiver 209 receives instructions from CPU 211 pursuant to mobile logic 214 stored on memory 213. CPU 211 controls the other components of mobile device 201 including display 203 and microphone 207. Memory 212 includes any computer readable medium, such as RAM, ROM, Flash, etc. Power supply 215 provides power to each of the components of mobile device 201, and can include a battery as well as an interface to an external power supply. Memory 213 stores mobile logic 214, in addition to logic for operating the components of mobile device 201.

Logic 214 includes a plurality of logical software components for transmitting a request for a presentation to electronic devices across a network, as well as for transmitting a unique identifier of mobile device 201. The unique identifier is any alpha-numeric string of characters that distinctly identify the particular mobile device against any other mobile or electronic device. For instance, the unique identifier is a MAC address. A combination of values can be used, such as a MAC address and a serial number. The mobile logic 214 further includes a component for receiving a presentation of a remote control from an electronic device across a network or communication path. Other components of logic 214 include components for parsing the presentation to retrieve a plurality of commands for the electronic device, and mapping the commands to a remote control layout. The remote control layout may be provided by the electronic device to be controlled. Alternatively, the remote control layout is user defined, as further elaborated upon herein. In either case, the presentation is displayed on screen 203 of mobile device 201. A user remotely controls an electronic device by touching or tapping a region of the touchscreen that is displaying a particular desired command. Command logic in logic 214 detects the tap, and transmits a command corresponding to the command mapped to the region of the layout provided in the presentation. Logic 214 further includes customization logic that enables users to define their own layout, and to map the commands in the received presentation to the customized layout. The command is transmitted across the network or a communications path to the electronic device.

In addition to using a touchscreen, a keyboard may be included to transmit more complex information such as text messages or e-mails. This may be the case when mobile device 201 is a cellular telephone. Many cellular telephones include hardware capable of performing the functions of mobile device 201 and support custom logic or software, such as logic 214. In fact, mobile device 201 may include any number of transceivers to communicate with assorted wireless and personal area networks and/or communications paths.

Figure 3:
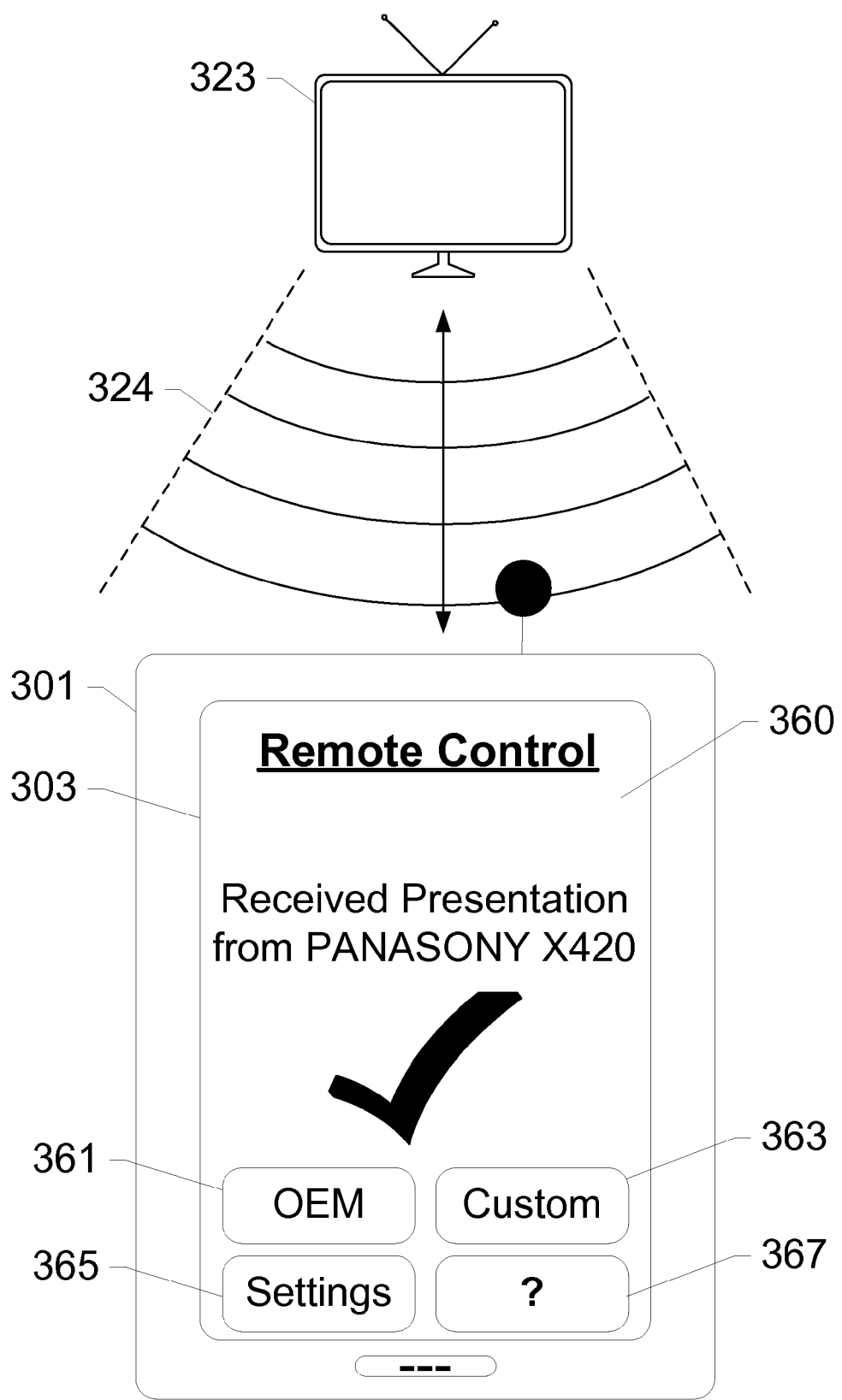
FIG. 3 shows a communication path between an electronic device and a mobile remote control device, according to an exemplary embodiment of the present subject disclosure.

FIG. 3 shows a communication path between an electronic device and a mobile remote control device, according to an exemplary embodiment of the present subject disclosure. Communication 324 is bidirectional, enabled via transceivers in both electronic device 323 and mobile device 301, and includes both direct connections across a local-area network LAN (via, for instance, a router), as well as a direct peer-to-peer connection such as in an ad-hoc network. As shown in the present embodiment, one aspect of bidirectional communications path 324 is displayed on display 303 of mobile device 301. A remote control application 360 displays an indication that a presentation has been received from electronic device 323. Remote control application 360 may have initially transmitted a unique identifier of mobile device 301, and in response, received the presentation from electronic device 323. Remote control application 360 additionally provides the user an opportunity to customize a remote or to select a customized remote, by displaying buttons 361 and 363. Settings button 365 launches a separate screen permitting the user to adjust properties of remote control application 360. Help button 367 triggers a context-sensitive help screen, answers to frequently-asked questions, or live customer support.

As indicated herein, electronic device 323 may include logic for determining that mobile device 301 has permission to act as a remote control. This determination occurs using one or more of several methods, including referring to a whitelist or a blacklist of unique identifiers, using a MAC address filter, etc. Further, group security models may be defined by an owner/user of electronic device 323. Each group of unique identifiers is assigned a specific set of commands, or a specific presentation. For instance, a proprietor of a sports bar programs all his televisions to allow remote control access for regular customers only. A regular customer requests that the MAC address of his mobile device be added to the MAC address filter on each television. Subsequently, regular customers are able to switch the television on, change the channel, etc., simply by using their mobile device, or another mobile remote control device offered by the proprietor himself. In other embodiments, customers are offered an option to purchase remote control privileges. Referring back to FIG. 3, upon detecting the presence and unique identity of mobile device 301, television 323 may transmit a purchase form to remote control application 360. Upon successfully completing the form and transmitting payment, user of mobile device 301 is able to remotely control television 323. For a user that refuses to purchase a particular privilege, a limited presentation is transmitted to mobile device 301, which excludes any commands that the user did not pay for.

The proprietor of the sports bar may allow regulars to change the channel for free, but adjusting the volume is a paid privilege. The limited presentation may be provided with an alternate layout excluding or disabling the volume controls. Thus, the present subject disclosure provides for layers of permission, offering each layer a set of specific commands and customized presentations for each set. Upon a full reading of this disclosure, a person having ordinary skill in the art will recognize that this feature can be applied to several diverse situations, such as parental control, authentication, electronic voting/polling, granting access to secure areas, etc.

Figure 4A:
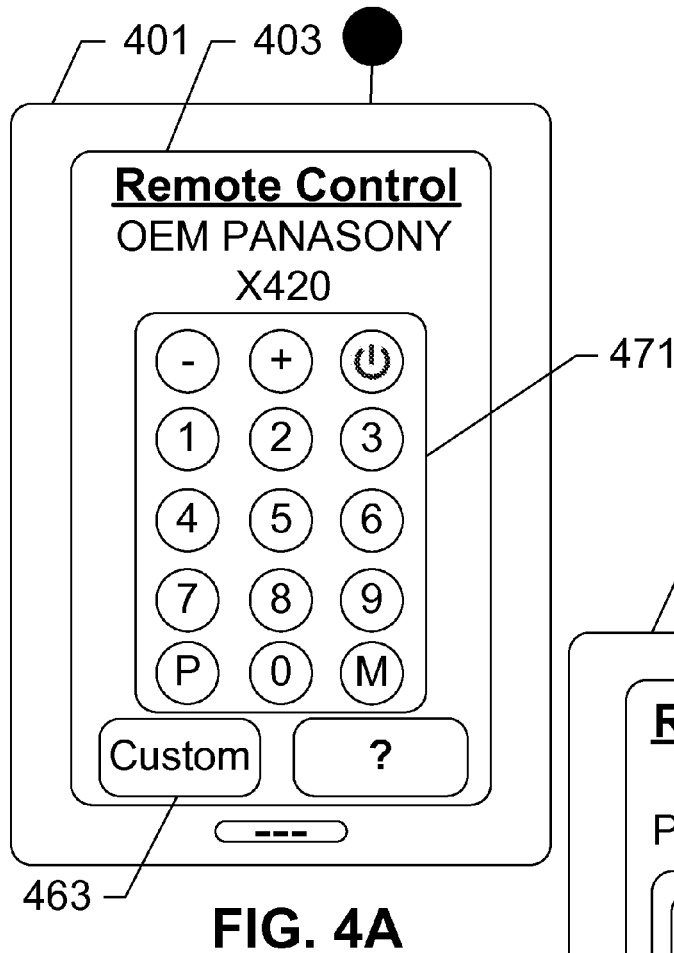
FIGS. 4A and 4B respectively show an OEM presentation and a custom presentation on a mobile device, according to an exemplary embodiment of the present subject disclosure.
Figure 4B:
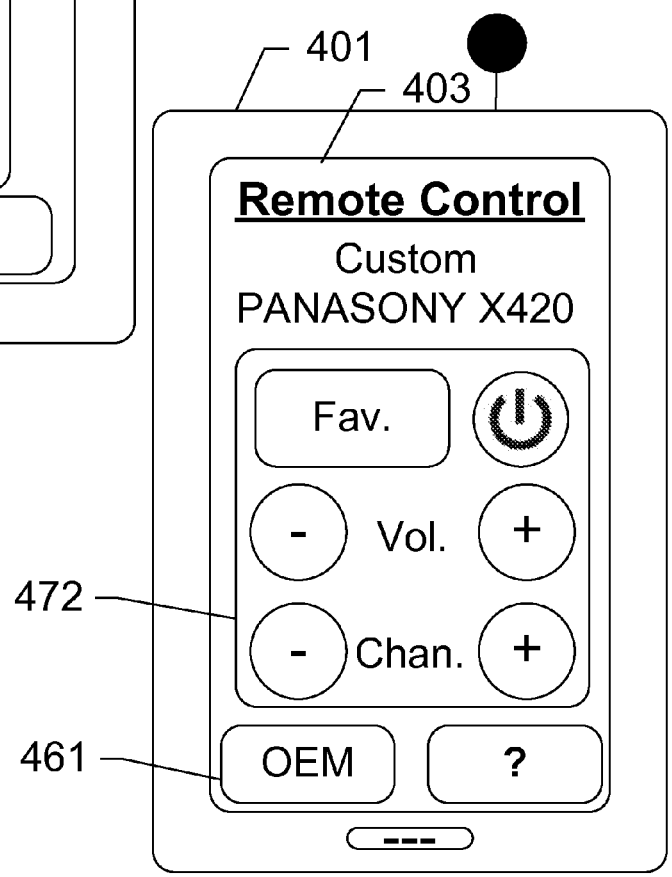

FIGS. 4A and 4B respectively show an OEM presentation and a custom presentation on a mobile device, according to an exemplary embodiment of the present subject disclosure. As described herein, mobile logic onboard mobile device 401 includes customization features, enabling a user to define a custom layout of controls, and re-mapping the received commands to the custom layout. FIG. 4A shows an OEM layout, based upon an OEM presentation received from an electronic device. For instance, a television with the identity "OEM PANASONY X420" has approved mobile device 401 and transmitted an OEM presentation to mobile device 401. The OEM presentation includes a plurality of commands to control the electronic device, as well as a layout. The received presentation is parsed, and displayed as remote control 471 on display 403 of mobile device 401. Remote control 471 includes most basic television controls, such as power, volume, channel numbers, and presets/memory controls. The application further enables the user to switch to a custom remote control via button 463.

FIG. 4B shows a custom remote control for PANASONY X420, according to an exemplary embodiment of the present subject disclosure. Although several customization options are available, FIG. 4B shows a very basic control set, possibly customized for easy viewing, or for someone with limited finger mobility. Therefore, the custom remote control 472 includes simple larger buttons for basic tasks. As mentioned above, the layout of the controls could take any form, such as XML, HTML, etc. In this embodiment, the button sizes are increased, certain controls (such as the channel numbers) are hidden, and a Favorites button is provided to switch between a user's favorite channels without having to type in a number. Other adjustments to controls and layouts will become apparent to one of ordinary skill in the art in light of this disclosure. In either case, logic onboard mobile device 401 maps the commands for the electronic device to the specific regions of remote control 472, as defined by the user. To map commands, a proprietary or open source standard of commands is used. Similar to the pulses of Infrared light transmitted by existing remote control devices, commands between mobile device 401 and an electronic device follow a defined code or language, such that the remapping process is streamlined. For instance, a standard signal for powering up/down the electronic device is received in the presentation, and remapped to the new power button defined by the user. More complex command structures, batches of commands, and macros are possible.

In other embodiments, commands for more than one device may be mapped to the same custom remote control. For instance, a user may want a power command to control a television, channel commands to control a set-top box, and volume commands to control an audio system, all on one custom remote control. These commands are mapped to the layout of buttons on the custom remote control. The custom remote control is then stored on the memory of mobile device 401 so the user can recall the custom remote control at a later time.

Figure 5:
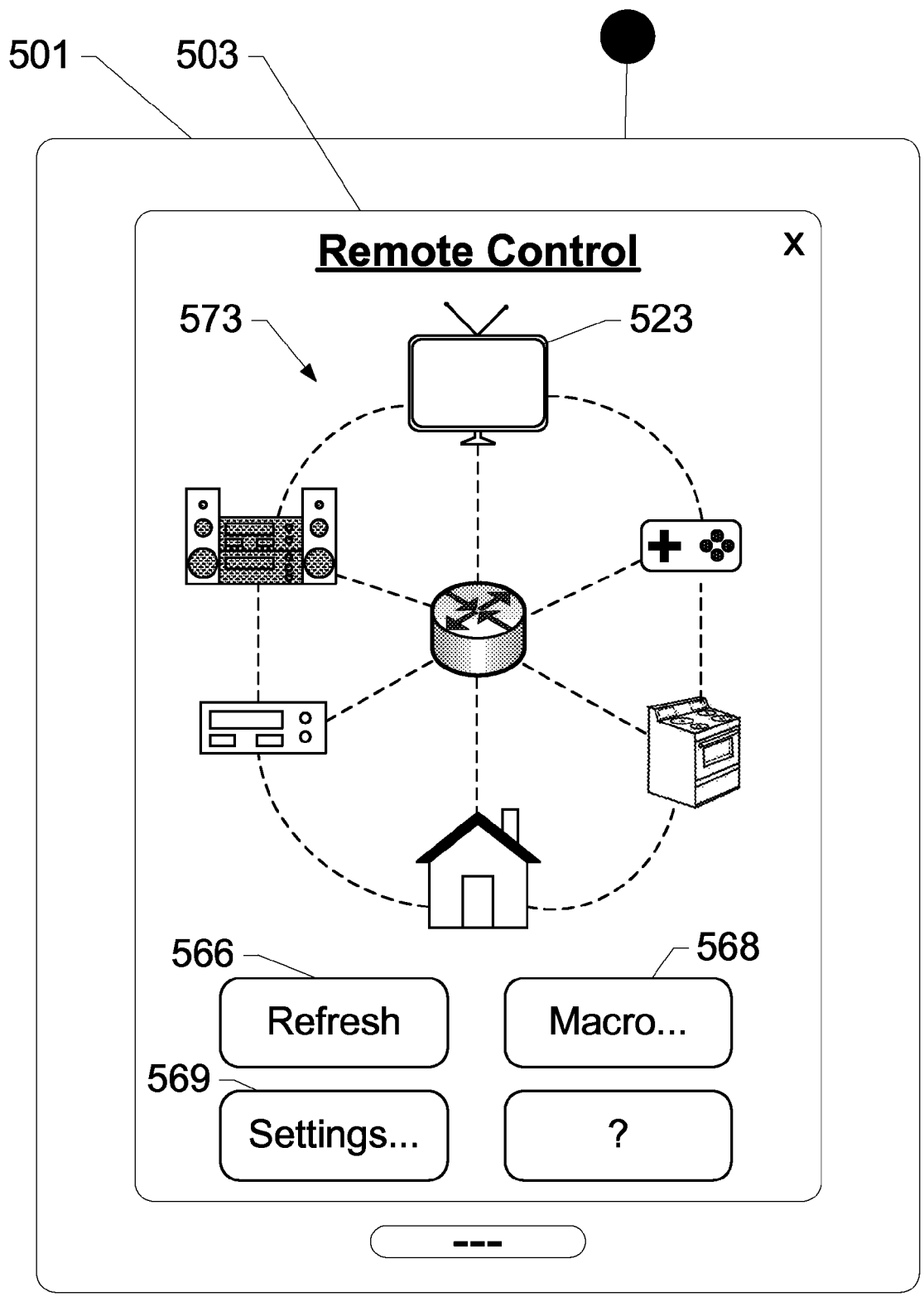
FIG. 5 shows a remote control application displayed on a mobile device, according to an exemplary embodiment of the present subject disclosure.

FIG. 5 shows a remote control application on a mobile device for controlling a plurality of electronic devices, according to an exemplary embodiment of the present subject disclosure. A remote control application displayed on touchscreen 503 of mobile device 501 is showing a layout of all devices detected within a proximity of mobile device 501. The detected devices include television 523, audio system 525, set-top box 521, building 550, appliance 527, and video gaming system 529. Possibly, mobile device 501 has received presentations from all these electronic devices. Alternatively, the layout simply shows a list of electronic devices that are broadcasting their identities. To control a device a user would touch or tap the icon on touchscreen 503. For instance, to control television 523, the user would tap icon 523. Then the remote control for the television would be displayed, as shown in FIGS. 4A and 4B. Alternatively, if the presentation has not yet been downloaded, touching icon 523 would trigger the presentation download shown in FIG. 3.

In either case, interface 573 additionally shows the relationships and/or connections between the electronic devices, and further allows the user to refresh 566, define a macro 568, or change the settings 569 of the remote control application. Pushing refresh button 566 prompts the transceiver onboard mobile device 501 to scan the area around mobile device 501 for any new electronic devices that are broadcasting their identity. Defining a macro 568 enables a user to create a batch of commands, potentially controlling multiple devices. For instance, a simple macro includes commands for turning on the set-top box, audio system, and television, and could be called "System Power." Executing the macro again would switch off these electronic devices. More complex macros may be envisioned, including defining volume controls for specific channels, switching inputs from a set-top box to a video-game system, activating a security system in a house, shutting down all appliances when leaving the house, etc.

Further, a user may define relationships between electronic devices based upon the connections between the electronic devices. For instance, a relationship is defined between television 523, audio system 525, and set-top box 521. The relationship enables a single layout or presentation to be used to control both devices. Specifically, pushing the volume button on a displayed remote control would command audio system 525, pushing the power button would control all three devices, and pushing the channel button would control set-top box 521. Other combinations of commands and relationships are possible. Macros may also be used to provide features such as channel lock, volume lock, to disable certain functions on TV and delegate the features to other devices (such as the sound system), and so on.

Figure 6A:
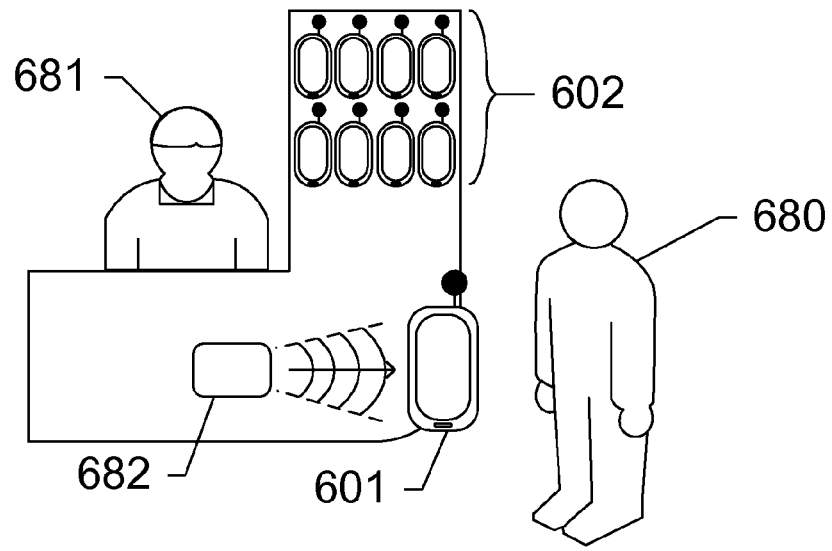
FIGS. 6A and 6B show a system for remotely controlling electronic devices in a hotel room, according to an exemplary embodiment of the present subject disclosure.
Figure 6B:
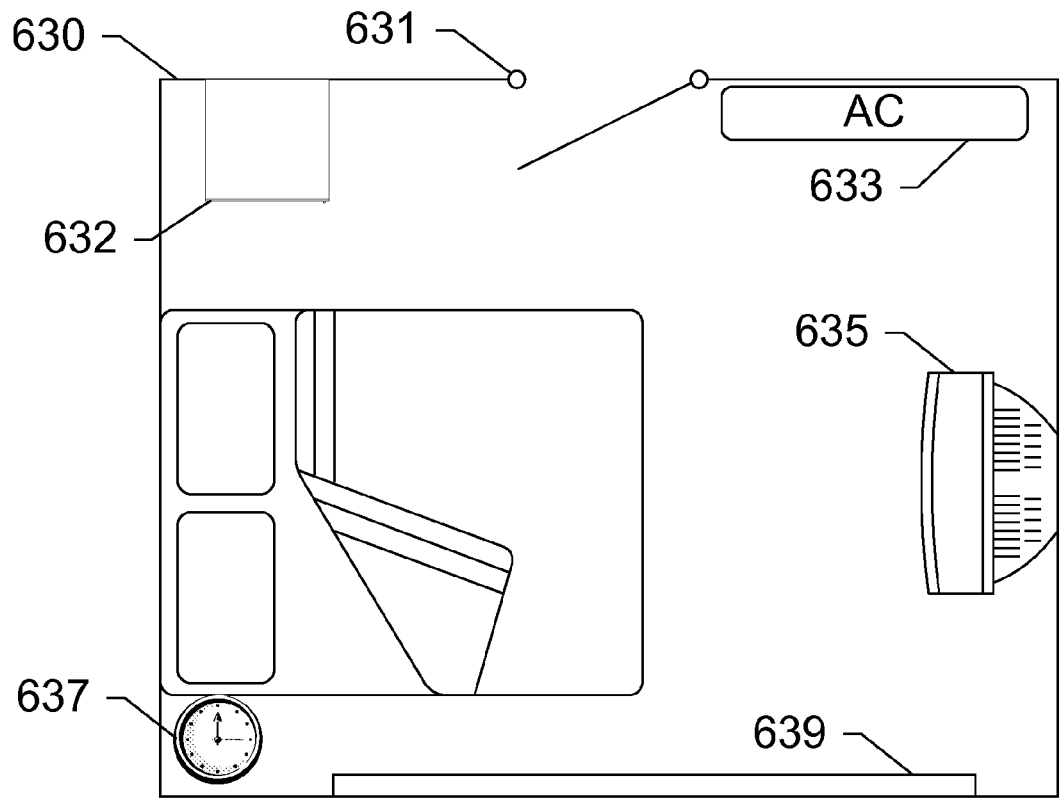

FIGS. 6A and 6B show a system for remotely controlling electronic devices in a hotel room, according to an exemplary embodiment of the present subject disclosure. As described earlier, a mobile remote control device need not be owned by a user, as is in the case of a remote control application on a cellular telephone. In some embodiments such as the one shown in FIG. 6A, a plurality of mobile remote control devices 602 is offered to guests of a hotel. A guest 680 approaches a concierge 681 to book a hotel room. Concierge 681 goes through the necessary motions of finding an empty room and assigning the room number to the guest 680. Concierge 681 then picks a mobile remote control device 601 from the plurality of devices 602, and programs mobile device 601 with the necessary presentations of the electronic devices in the hotel room. A programming device 682, using any wireless or wired communication technology, provides the presentations for devices in that particular room to mobile remote control device 601.

Then, the user walks over to the hotel room 630, as shown in FIG. 6B. Room 630 includes the following electronic devices: door lock 631, mini-fridge 632, climate control 633, television 635, alarm clock 637, and window shade 639. All of these devices have communication abilities, and are able to be controlled by a mobile remote control device such as device 601 provided to guest 680. Similar to the embodiment of FIG. 5, a layout of these electronic devices is provided on a display of mobile remote control device 601, and the user may control one or multiple electronic devices simply by touching the device on the display and accessing the remote control presentation of that device. For instance, the user unlocks door 631 and powers on television 635 using mobile remote control device 601. Macros may be defined by the user to activate alarm clock 637 and open window shades 639 at a specified time. Moreover, this system allows for dynamic billing of a user's account based upon his remote control choices. For instance, if user 680 decides to unlock mini-fridge 632, or to watch pay-per-view (PPV) programming on television 635, the remote control 601 would pop up a purchase screen, allowing user 680 to provide his account details or simply to authorize billing. For a user that refuses to purchase a particular privilege, a limited presentation is transmitted to mobile remote control device 601, which excludes any commands that the user did not pay for. The limited presentation is provided with an alternate layout. For purchased commands, either instantly or upon returning device 601 back to concierge 681, the charges are approved and billed to an account of user 680. Furthermore, simply having the device within a proximity may be used to trigger a command. For instance, a user 680 carrying mobile device 601 walks towards room door 631, which automatically unlocks if the distance reaches a certain threshold. Further, upon detecting that mobile remote control device 601 has left the room, electronic devices such as TV 635, light, etc. would automatically shut down to save power.

Figure 7:
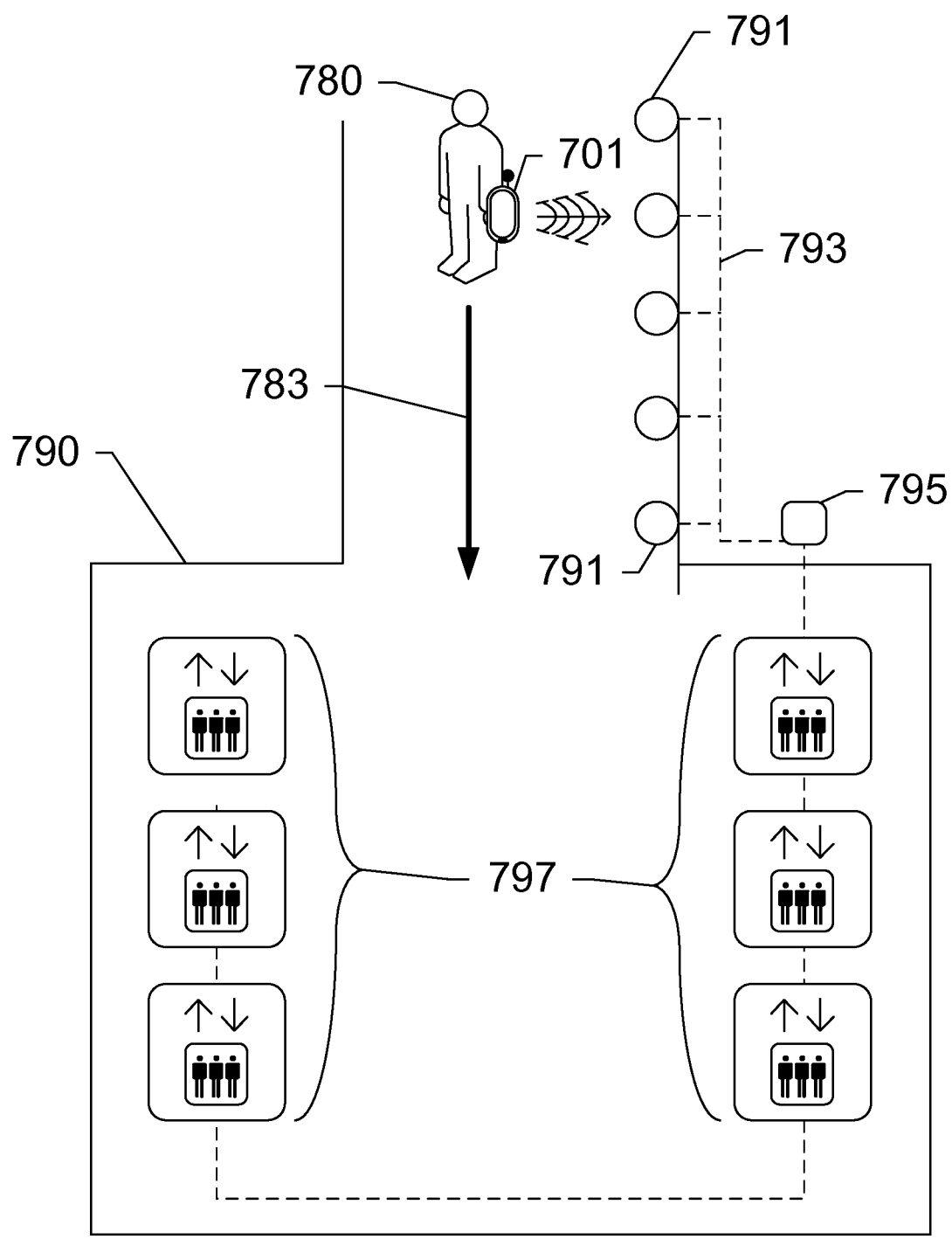
FIG. 7 shows a system for controlling elevators using proximity and motion-sensing, according to an exemplary embodiment of the present subject disclosure.

FIG. 7 shows a system for controlling electronic devices using proximity and motion-sensing, according to an exemplary embodiment of the present subject disclosure. As mentioned herein, a user carrying a mobile remote control device can use his position and movement as an automatic input to control electronic devices based on proximity. In other words, a movement in a specific direction enables a user to access a resource. The present embodiment shows this in the context of destination priority elevators in a building 790. These elevators 797 adjust their positions to where the highest traffic is expected to be, using a series of algorithms based on past patterns of use. A controller 795 is used to program and control elevators 797. Controller 795 additionally communicates with proximity sensors 791 via a network 793. As a user 780 carrying mobile device 701 walks along a trajectory 783, the proximity of device 701 is sensed by each proximity sensor 791. The motion of user 701, as well as a velocity 783, is transmitted to controller 795. Based upon this information, known distances within building 790, and current positions of elevators 797, a particular elevator is summoned to open just in time for the arrival of user 780. Further, the optimal choice of elevators 797 is displayed on mobile device 701, so that user 780 knows exactly where to go. In some cases, user 780 may input his destination floor via mobile device 701, thereby providing valuable additional information for controller 795. For instance, user 780 is a frequent visitor, as in the case of an employee of a corporation housed in building 790. In this case, a database entry already exists on controller 795 for user 780, including the unique identifier of mobile device 701, a location within the building of the user's office, a typical time of arrival of user 780, etc. All of these factors, along with the user's speed and proximity, are used to provide an input to controller 795, so that the most efficient elevator 797 is summoned.

The above-described command input (as a function of proximity and motion) may be applied to several diverse situations. For instance, computer interfaces are locked and unlocked based upon a proximity of mobile remote control devices. Privacy concerns may be addressed in this way. Based on the proximity of an intruder, a different presentation is displayed upon a computer. For instance, if the boss walks into a room while the employees are playing a video game, the proximity of the boss triggers a warning, or a new presentation to be displayed so that the boss remains unaware. This may also be applied to building security and automations. For instance, doors, windows, and climate-control components can be activated or de-activated based upon a proximity and number of mobile devices in the area. High traffic rooms have more resources dedicated towards them based on the mobile devices detected in the room. If each mobile device is used as a remote control, an optimal setting can be determined based on the number of devices attempting to control the electronic device.

Moreover, the present subject disclosure allows fine-grained detection of a particular mobile remote control device within a constellation of remote control devices. Such fine-grain proximity can be used to pinpoint users within a volume such as a building, room, car, etc. This can be applied to video game systems too, wherein a camera is used to detect the players in a game. A user holding a particular mobile remote control device with a unique identity is recognized as being an active user, so that the camera can ignore the other bodies detected in its frame. This eliminates any errors of detection by the camera caused by, for instance, lighting conditions, skin tone, etc. Thus, the present subject disclosure provides remote control input from a mobile device working in combination with several input devices.

Further, the above-described embodiment may be implemented in both local area networks, as well as ad-hoc peer-to-peer networks. The proximity sensors would broadcast a specific SID for a direct device-to-device connection, and receive location/movement information directly from the mobile device instead of going through a router. Aside from the different type of connection, the proximity detection and velocity determination features work in the same manner.

Finally, the present subject disclosure may be integrated with other existing technologies, such as device controllers or aggregators in multiple-device environments (such as the home theater described herein) to provide a seamless and productive hassle-free environment. Often, the state of one or more electronic devices is related to the state of one or more other electronic devices within the same environment. For example, a user may be watching television (TV) when the telephone rings. The user wishes to answer the call, but to effectively communicate with the caller, the user must mute the television so that sound from the TV does not interfere with the telephone conversation. Pattern recognition and aggregation technologies to remedy this are described in commonly-owned U.S. Pat. Nos. 6,795,404, 7,626,952, 7,512,577, and 7,474,667, the contents of which are hereby incorporated herein in their entirety. The present subject disclosure may be integrated with these systems to automatically monitor and control a plurality of electronic devices, while establishing device interaction rules based on recognized patterns, and providing streamlined communications paths.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A mobile remote control device, comprising:
   a memory to store instructions;
   a processor coupled to the memory;
   a transceiver in communication with the processor;
   a display in communication with the processor; and
   an input device in communication with the processor, wherein responsive to executing the instructions, the processor performs operations comprising:
      transmitting a unique identifier,
      displaying a layout comprising an electronic device detected within a proximity of the remote control device, wherein the layout comprises an icon representing the detected electronic device and relationships between the detected electronic device and other electronic devices in communication with the mobile remote control device,
      processing a selection of the electronic device,
      receiving a presentation of a remote control from the electronic device across a network, the presentation including an identity of the electronic device and controls for commanding the electronic device, and
      displaying the remote control on the display.

2. The mobile remote control device of claim 1, wherein the operations further comprise:
   receiving an input from a user via the input device,
   mapping the input to a command on the remote control, and
   transmitting the command to the electronic device.

3. The mobile remote control device of claim 1, wherein the operations further comprise enabling a user to define a custom remote control and mapping the received presentation of the remote control to the custom remote control.

4. The mobile remote control device of claim 1, wherein the operations further comprise:
   receiving a plurality of inputs from a user,
   generating a macro based on a plurality of commands, and
   transmitting the macro to a plurality of electronic devices.

5. The mobile remote control device of claim 1, wherein the unique identifier is a MAC address.

6. The mobile remote control device of claim 1, wherein the unique identifier is a radio-frequency identifier (RFID).

7. The mobile remote control device of claim 1, wherein the display and the input device are both part of a touchscreen display.

8. The mobile remote control device of claim 1, wherein the transceiver comprises a cellular transceiver, and
   wherein the operations further comprise enabling communication across a cellular network.

9. A system for remotely controlling an electronic device, the system comprising:
   a mobile device comprising a mobile processor, a mobile memory, a mobile transceiver, a display, and an input device, wherein the transceiver enables communication across a network;
   an electronic device comprising a device transceiver to enable communication across the network, a memory to store instructions, and a processor coupled to the memory, wherein responsive to executing the instructions, the processor performs operations comprising:
      broadcasting an identity of the electronic device,
      receiving a unique identifier of the mobile device, and
      transmitting a presentation of a remote control of the electronic device to the mobile device via a communication path on the network, wherein the presentation includes the identity of the electronic device and controls for commanding the electronic device, and
   wherein the mobile processor performs operations comprising:
      transmitting the unique identifier;
      displaying a layout comprising the electronic device, wherein the electronic device is detected within a proximity of the mobile device, wherein the layout comprises an image representing the detected electronic device and images representing relationships between the detected electronic device and other electronic devices;
      processing a selection of the electronic device;
      receiving the presentation of the remote control; and
      displaying the remote control on the display of the mobile device.

10. The system of claim 9, wherein the wherein the mobile processor performs operations comprising:
    receiving an input via from a user via the input device;
    mapping the input to a command on the remote control; and
    transmitting the command to the electronic device.

11. The system of claim 9, further comprising a plurality of electronic devices on the network, wherein each of said plurality of electronic devices transmits a device-specific presentation to the mobile device.

12. The system of claim 11, wherein a first and a second electronic device of the plurality of electronic devices are in communication with one another,
    wherein the first electronic device comprises a first electronic device processor, wherein the first electronic device processor performs operations comprising transmitting a limited presentation to the mobile device, and
    wherein the limited presentation excludes a command included in the presentation transmitted by the second electronic device.

13. The system of claim 9, wherein the operations of the processor of the electronic device further comprise:
    determining that the received unique identifier of the mobile device matches one of a plurality of allowed unique identifiers; and
    transmitting the presentation to the mobile device.

14. The system of claim 13, wherein the operations of the processor of the electronic device further comprise:
    determining that the received unique identifier matches one of a plurality of lower tier unique identifiers; and
    transmitting a limited presentation to the mobile device.

15. The system of claim 14, wherein the operations of the processor of the electronic device further comprise:
   determining that the received unique identifier does not match any of a plurality of unique identifiers of any tier; and
   transmitting to the mobile device an offer to purchase a permission to control the electronic device.

16. The system of claim 9, wherein the operations of the processor of the electronic device further comprise: determining that the mobile device is within a threshold distance of the electronic device.

17. The system of claim 16, wherein a motion and a proximity of the mobile device together provide an input that is transmitted as a command to the electronic device.

18. The system of claim 9, wherein the identity of the electronic device is any combination of a make and a model of the electronic device.

19. A method for remotely controlling an electronic device, the method comprising:
   broadcasting, by an electronic device comprising a processor, an identity of the electronic device;
   receiving, by the electronic device, a unique identifier of a mobile device;
   transmitting, by the electronic device, the unique identifier;
   displaying, by the electronic device, a layout comprising the electronic device, wherein the electronic device is detected within a proximity of the mobile device, wherein the layout comprises relationships between the electronic device and other electronic devices;
   processing, by the electronic device, a selection of the electronic device;
   receiving, by the electronic device, a presentation of a remote control for the electronic device, wherein the presentation includes the identity of the electronic device and controls for commanding the electronic device; and
   displaying the remote control on the display of the mobile device.

20. The method of claim 19, further comprising transmitting, by the electronic device, to the mobile device a plurality of presentations for a corresponding plurality of electronic devices.

* * * * *